Patented Feb. 10, 1942

2,272,198

UNITED STATES PATENT OFFICE 2,272,198

SYNTHESIS OF VITAMIN B6

Stanton A. Harris, Westfield, N. J., assignor to Merck & Co., Inc., Rahway, N. J., a corporation of New Jersey No Drawing. Application September 1, 1939, Serial No. 293,131

8 Claims. (Cl. 260—296)

This invention relates to the synthesis of vitamin $B_6$ and to various intermediates employed in the synthesis.

In a co-pending application, Serial No. 267,603, it is disclosed that 2-methyl-3-amino-4-ethoxymethyl-5-aminomethylpyridine dihydrochloride can be diazotized to produce 2-methyl-3-hydroxy-4-ethoxymethyl-5-hydroxy-methylpyridine which is converted to vitamin $B_6$ by treatment with concentrated hydrobromic acid to form 2-methyl-3-hydroxy-4,5-di-(bromomethyl)pyridine hydrobromide, boiling the latter compound with water to hydrolyze the bromomethyl radicals to hydroxymethyl radicals, and removing the bromide ion by means of silver or suitable neutralization, concentration and extraction methods.

That application also discloses an alternative method for hydrolyzing 2-methyl-3-hydroxy-4-ethoxymethyl-5-hydroxymethylpyridine by boiling in a 50% sulfuric acid solution, followed by suitable neutralization, concentration and extraction steps to remove the sulfate radical.

I have discovered that the above methods of obtaining vitamin $B_6$ may be varied, and also, that under certain conditions, some steps can be omitted. This discovery is of importance in the commercial use of the synthesis of vitamin $B_6$.

For example, 2-methyl-3-amino-4-alkoxymethyl-5-aminomethylpyridine or its dihydrohalide may be treated with concentrated hydrohalogen acid to form a dihydrohalide of 2-methyl-3-amino-4-halogenmethyl-5-aminomethylpyridine, the latter compound is converted to the dihydrohalide of 2-methyl-3-amino-4-hydroxymethyl-5-aminomethylpyridine, which yields vitamin $B_6$ when diazotized. The treatment of a 2-methyl-3-amino-4-alkoxymethyl-5-aminomethylpyridine dihydrohalide with concentrated hydrohalogen acid may be omitted, and a 2-methyl-3-amino-4-hydroxymethyl-5-aminomethylpyridine dihydrohalide formed directly by heating the former compound with a dilute hydrohalogen acid.

Alternatively, a dihydrohalide of 2-methyl-3-amino-4-alkoxymethyl-5-aminomethylpyridine may be diazotized to form 2-methyl-3-hydroxy-4-alkoxymethyl-5-hydroxymethylpyridine which is then treated with a concentrated hydrohalogen acid to form 2-methyl-3-hydroxy-4,5-di-(halogenmethyl)pyridine, which is converted to vitamin $B_6$ by hydrolysis. 2-methyl-3-hydroxy-4-alkoxymethyl-5-hydroxymethylpyridine when heated with dilute hydrochloric acid in water at 150° C. yields vitamin $B_6$ hydrochloride directly.

I have also discovered that, when 2-methyl-3-hydroxy-4-alkoxymethyl-5-hydroxymethylpyridine is treated with 50 or 60% sulfuric acid as disclosed in the above identified co-pending application, during the hydrolysis some ring closure occurs to form 2-methyl-3-hydroxy-4,5-epoxydimethylpyridine of the following structure:

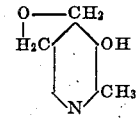

The hydrochloride of this compound is also formed to some extent when 2-methyl-3-hydroxy-4,5-di-(bromomethyl)pyridine is treated with silver chloride in the presence of water.

The compounds of the present invention may be represented by the general formulae:

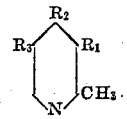

and

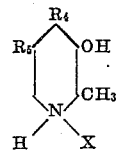

wherein $R_1$ is a member selected from the group consisting of amino, aminohydrohalide, and hydroxy, $R_2$ is a member selected from the group consisting of alkoxymethyl, halogenmethyl, and hydroxymethyl, $R_3$ is a member selected from the group consisting of aminomethyl, aminomethylhydrohalide, and halogenmethyl, and also hydroxymethyl when $R_1$ is hydroxy and $R_2$ is alkoxymethyl, and wherein $R_2$ and $R_3$ together are epoxydimethyl, $R_4$ is a member selected from the group consisting of alkoxymethyl, halogenmethyl, and hydroxymethyl, $R_5$ is a member selected from the group consisting of halogenmethyl, and also hydroxymethyl when $R_4$ is alkoxymethyl, and wherein $R_4$ and $R_5$ together are epoxydimethyl, and $X$ is a halogen.

The following examples illustrate specific methods of carrying out the present invention, but it is to be understood that these examples are given by way of illustration and not of limitation.

Example I 1.55 grams of the dihydrochloride of 2-methyl-3-amino-4-ethoxymethyl-5-aminomethylpyridine are dissolved in 20 cc. of constant boiling hydrobromic acid and distilled until about one-half of the acid is distilled over. The concentrate is poured into a test tube, cooled, and crystallization induced by scratching. The product is centrifuged, washed with acetone and ether, and dried; melting point about 238.5° C. with decomposition. The product is recrystallized by dissolving in 1 to 2 cc. of water and adding 8 to 10 cc. of alcohol. On standing in ice, crystallization takes place; melting point about 260–265° C., with effervescence if the sample is not preheated. The yield of 2-methyl-3-amino-4-bromomethyl-5-aminomethylpyridine dihydrobromide is about one gram.

1 gram of 2-methyl-3-amino-4-bromomethyl-5-aminomethylpyridine dihydrobromide is dissolved in 100 cc. of water and heated on a steam bath for 1 to 2 hours. The mixture is clarified by filtration with charcoal, and the bromine ions are removed by stirring with an excess of silver chloride. The filtrate is concentrated almost to dryness under vacuum produced by a water pump, whereupon crystallization takes place. The 2-methyl-3-amino-4-hydroxymethyl-5-aminomethylpyridine dihydrochloride is recrystallized by dissolving in a little water, adding alcohol and scratching; melting point 235–237° C. with decomposition.

Alternatively, one gram of the monohydrate of 2-methyl-3-amino-4-ethoxymethyl-5-aminomethyl-dihydrochloride is dissolved in 15 cc. of 2.5N HCl and heated in a bomb tube at 175–180° C. for four hours. The solution is filtered with a little charcoal, concentrated just to dryness at the water pump and recrystallized from a minimum of 95% alcohol. The yield of the 2-methyl-3-amino-4-hydroxymethyl-5-aminomethylpyridine dihydrochloride is .67 g. or 80% of the theory. M. P. 235–237° C. This compound crystallizes very easily from 95% alcohol or a small amount of water plus alcohol.

1.28 grams of 2-methyl-3-amino-4-hydroxymethyl-5-aminomethylpyridine dihydrochloride in 22 cc. of distilled water is added simultaneously with a solution of 2.24 grams $NaNO_2$ in water to 45 cc. of hot 2.5N HCl. After completion of the diazotization, the solution is lemon yellow color. This acid solution is concentrated to dryness at the water pump and the residue extracted with acetone which removes some of the color. The vitamin $B_6$ hydrochloride is extracted from the sodium chloride with hot absolute alcohol. This warm alcohol solution is filtered with a little charcoal and concentrated to small volume. On the addition of acetone, vitamin $B_6$ hydrochloride crystallizes. Yield 0.5 gram or 45% of theory. M. P. 208° C.

Example II 300 grams of 2-methyl-3-amino-4-ethoxymethyl-5-aminomethylpyridine dihydrochloride are dissolved in 430 cc. of water, neutralized with sodium hydroxide in phenolphthalein and 540 grams sodium nitrite are added. This solution is added slowly to 6500 cc. of hot (90° C.) 2N sulfuric acid with stirring. There is an immediate evolution of nitrogen, followed by the formation of a slightly yellow solution. The solution is heated for an additional 15 minutes, treated with just enough urea to decompose the excess nitrous acid, cooled, and neutralized to pH 7.2 with sodium hydroxide solution, using bromothymol blue as an outside indicator. The slightly reddish solution is concentrated under diminished pressure until sodium sulfate starts to separate. At this point a black, oily layer is formed, which contains most of the desired product. It is dissolved in 2¼ kg. acetone, filtered from separated sodium sulfate, and evaporated to dryness. The residue is then redissolved in 2¼ kg. of acetone, filtered from the separated sodium chloride, and evaporated to dryness. It is taken up a third time in 2¼ kg. of acetone, filtered from an insoluble material and diluted with an equal volume of ether, whereupon a dark red oil separates. The supernatant liquid is decanted and filtered with the aid of carboraffin. The slightly yellow solution is evaporated to a syrup; yield of 2-methyl-3-hydroxy-4-ethoxymethyl-5-hydroxymethylpyridine is 120 grams or about 50% of the theory. Additional material can be obtained from the precipitated oil and by elution of the charcoal with acetone.

Fifty grams of the above material are dissolved in 500 cc. of acetone and treated with dry hydrogen chloride until the solution is acid to wet congo paper whereupon a brown colored hydrochloride crystallizes out. The addition of ether yields some additional crystals. These crystals are twice recrystallized by dissolving in a minimum of alcohol and adding an equal volume of acetone and filtering with the aid of carboraffin. The yield is 25.3 g. or 21.5% of the theory based on the original diamine; M. P. 135–136° C. Additional crystals may be obtained from the mother liquors.

0.2 gram of 2-methyl-3-hydroxy-4-ethoxymethyl-5-hydroxymethylpyridine hydrochloride are dissolved in 6 cc. of concentrated hydrochloric acid and heated for one hour in a constant temperature bath at 132° C. The tube is cooled in ice, opened and crystallization is induced by scratching. The crystals are recrystallized from concentrated hydrochloric acid; melting point about 206° C. after considerable darkening, starting at 195° C. The yield of recrystallized 2-methyl-3-hydroxy-4,5-di-(chloromethyl) pyridine hydrochloride is about 0.09 gram or 43%. Additional crystals may be obtained from the mother liquor.

0.05 gram of 2-methyl-3-hydroxy-4,5-di-(chloromethyl) pyridine hydrochloride is dissolved in 10 cc. of water and heated for one hour at 100° C. The solution is evaporated almost to dryness and the vitamin $B_6$ hydrochloride recrystallized from alcohol and acetone.

Example III

The process described in Example II may be simplified by dissolving 0.4 gram of 2-methyl-3-hydroxy-4-ethoxymethyl-5-hydroxymethylpyridine hydrochloride in 40 cc. of water containing 2 cc. of 2.5 N hydrochloric acid and heating the solution in a bomb tube at 155–160° C. for three hours. After cooling, the tube is opened and the contents are evaporated to dryness on a steam bath under reduced pressure. The crystalline residue is recrystallized from 95% alcohol, using charcoal for clarification; melting point 206–207° C., mixed melting point with analytically pure vitamin $B_6$ shows no depression. The yield is 2.81 grams or 80% of theory.

Example IV

In the preparation of vitamin $B_6$ hydrochloride from 2-methyl-3-hydroxy-4,5-di-(bromomethyl)- pyridine hydrobromide by boiling with water, and removing the bromine ions with silver chloride, a first crop of pure vitamin $B_6$ hydrochloride is obtained. The material from the mother liquor melts at about 195° C. and is recrystallized from 95% alcohol. On the addition of the acetone to the mother liquor, a crystalline material is obtained which melts at 234–235° C. On crystallization from absolute alcohol, the melting point of the 2-methyl-3-hydroxy-4,5-epoxydimethylpyridine hydrochloride becomes constant at 239–240° C. This compound has some biological activity when fed to vitamin $B_6$ deficient rats.

One gram of 2-methyl-3-hydroxy-4-ethoxymethyl-5-hydroxymethylpyridine hydrochloride is dissolved in 15 cc. of 60% sulfuric acid and heated until the temperature reaches 145° C. It is then cooled, neutralized to a pH of 7.2 with sodium hydroxide, extracted with acetone which is evaporated to dryness. It is taken up in acetone, filtered, and treated with dry hydrogen chloride. An oil separates which slowly crystallizes. The mother liquor is decanted and treated with ether and additional crystalization takes place slowly. The crystals are recrystallized from absolute alcohol. This compound is identical with the 2-methyl-3-hydroxy-4,5-epoxydimethylpyridine hydrochloride obtained above, as shown by mixed melting point.

Example V 3.7 grams of 2-methyl-3-hydroxy-4,5-epoxydimethylpyridine hydrobromide in 60 cc. of 48% hydrobromic acid is distilled until about one-half of the acid is removed. The solution is cooled in ice, whereupon the 2-methyl-3-hydroxy-4,5-di-(bromomethyl) pyridine hydrobromide crystallizes. The total yield is 6.42 grams (86.5%); M. P. 228.5° C. This compound may be hydrolyzed to vitamin $B_6$, by boiling with water, followed by treatment with silver chloride.

Modifications may be made in carrying out the present invention without departing from the spirit and scope thereof, and I am to be limited only by the appended claims.

I claim:
1. 2-methyl-3-amino-4-halogenmethyl-5-aminomethylpyridine dihydrohalide.
2. The dihydrobromide of 2-methyl-3-amino-4-bromomethyl-5-aminomethylpyridine.
3. 2-methyl-3-amino-4-hydroxymethyl-5-aminomethylpyridine dihydrohalide.
4. The dihydrobromide of 2-methyl-3-amino-4-hydroxymethyl-5-aminomethylpyridine.
5. The dihydrochloride of 2-methyl-3-amino-4-hydroxymethyl-5-aminomethylpyridine.
6. In the synthesis of vitamin $B_6$, the step which comprises reacting 2-methyl-3-amino-4-ethoxymethyl-5-aminomethylpyridine with concentrated hydrobromic acid.
7. In the synthesis of vitamin $B_6$, the step which comprises reacting 2-methyl-3-amino-4-bromomethyl-5-aminomethylpyridine dihydrobromide with water and silver chloride.
8. Compound selected from the group consisting of 2-methyl-3-amino-4-halogenmethyl-5-aminomethylpyridine dihydrohalide, and 2-methyl-3-amino-4-hydroxymethyl-5-aminomethylpyridine dihydrohalide.

STANTON A. HARRIS.